Dec. 25, 1934.    W. J. FRASER    1,985,341

METHOD OF MAKING TREAD MOLD ELEMENTS

Filed Nov. 7, 1932

Inventor
W. J. Fraser
by J. Edw. Maybee
ATTY

Patented Dec. 25, 1934

1,985,341

UNITED STATES PATENT OFFICE 1,985,341

METHOD OF MAKING TREAD MOLD ELEMENTS

William J. Fraser, Toronto, Ontario, Canada

Application November 7, 1932, Serial No. 641,658

10 Claims. (Cl. 29—148.2)

This invention relates to improvements in molds in which tires are shaped and vulcanized, and my object is to devise a mold and method of making the same which will greatly decrease the cost of mold, and reduce the expenditure for apparatus for producing the same.

I attain my object by so constructing the mold that inexpensive, initially plastic material may be employed in part in forming the main body of the mold, and by utilizing a tread element for the mold formed of segments of ductile material, which are deformable to different curvatures to enable molds to be built up of greater or lesser radius of curvature than the initial curvature of the segments, and which segments are cut from blanks of greater width by dividing the blank circumferentially at one side of the median plane, whereby each blank provides wide segments which may be fitted together side by side and end to end to form a wide tread mold element, and narrow segments which may be fitted together to form a narrow tread mold element.

Figure 1:
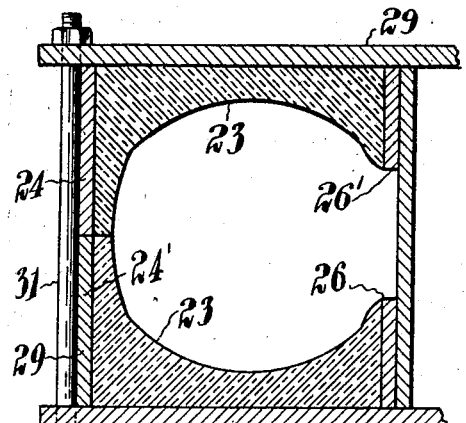
Figure 2:
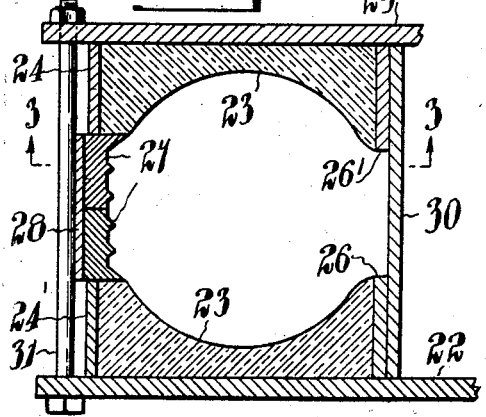
Figure 3:
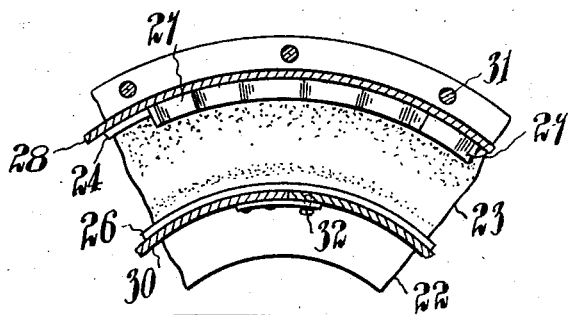
Figure 4:
Figure 5:
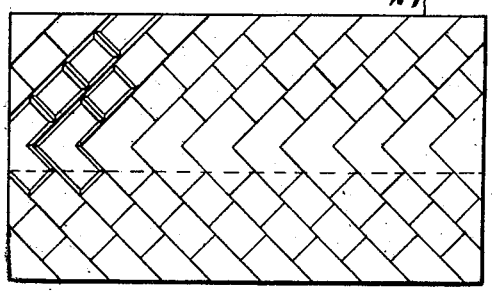

The invention is hereinafter more specifically described and is illustrated in the accompanying drawing in which Fig. 1 is a cross-section of a simple mold constructed in accordance with my invention;

Fig. 2 is a cross-section of a more elaborated form of mold;

Fig. 3, a section partly broken away on the line 3—3 in Fig. 2, but on a smaller scale;

Fig. 4, a diagrammatic view illustrating the deformation of a tread mold segment;

Fig. 5, a plan view of a blank from which tread mold segments are formed; and

Figure 6:
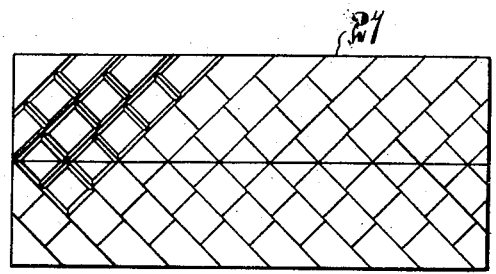
Figure 7:
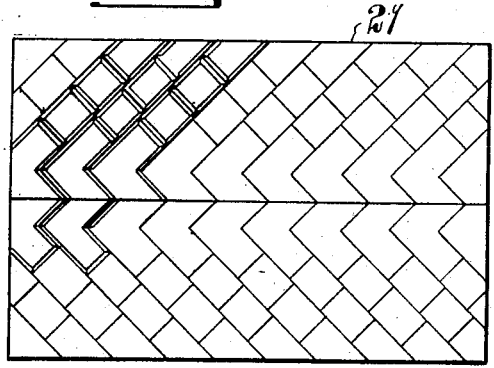

Figs. 6 and 7, plan views of tread mold segments fitted side by side to produce tread mold elements of different widths.

Referring particularly to Figs. 2–4 of the drawing, it will be seen that a complete mold comprises the metal plates 22 and 29, the concentric metal walls 24, 26, and 24', 26', the mold side-walls 23, and the collapsible metal inner band 30, and a tread mold element comprising the metal band 28 and the metal segments 27 which give shape to the tread portion of the molded tire. The plates are detachably held together by the bolts 31. The metal walls 26 and 26' and the band 30 form the inner circumference of the mold, while the metal wall 24 and 24' and tread mold element form the outer circumference. The band 30 has its end connected by bolts 32 so that it may be collapsed and removed thus allowing the side mold walls and their metal walls to be separated when a finished tire is to be removed.

An important feature of my invention is that the mold side-walls 23 are formed of a moldable, settable, cementitious material, such, for example, as Portland cement or Sorel's cement. This material is readily molded to shape and is amply strong to resist crushing stresses, while tensile strength is given by the confining metal structure.

A simpler form of the mold is shown in Fig. 1, in which the tread part of the mold is also formed of cementitious material, the halves of the mold being completely enclosed circumferentially by the bands 24, 26 and 24', 26', respectively. I can however employ a separate tread mold element of a material possessing greater tensile strength than cement.

In its simplest form the tread mold element may be an integral annulus of metal the inner surface having cut or molded thereon any desired tread pattern, but in the preferred form the tread is shaped by separate segments 27, fitted into and held in place by the metal band 28.

To produce these segments I first cast or otherwise produce a blank such as shown in Fig. 5. This is formed of a metal such as a suitable aluminum alloy, which possesses sufficient ductility to permit of the segments being deformed as hereinafter described. These blanks may be of such a width and circumferential curvature that they may be employed in building up a mold for a tire of intermediate width and intermediate circumferential curvature.

To produce a tread mold element for a tire of greater circumferential curvature, and therefore of less circumference, it is merely necessary to deform the blanks in suitable bending apparatus till they acquire the necessary greater curvature and to fit a sufficient number of blanks of a suitable length within the band 28. So also a tread mold element for a tire of less circumferential curvature and therefore of greater circumference can be produced by decreasing the curvature of the blanks, and fitting a sufficient number of a suitable length in a band of greater circumference. The deformation referred to above is illustrated in Fig. 4, the original curvature of the blank being illustrated in full lines, the increased curvature in broken lines, and the decreased curvature in dotted lines.

To produce a tread mold element having a greater or lesser width of tread, I divide each blank circumferentially at one side of its median plane, (see Fig. 5), thus producing one wide and one narrow segment. If two wide segments, cut one left and one right of the median plane, be now placed side by side with their cut edges in contact with one another, and fitted, with a sufficient number of other pairs of segments so formed, within a band 28 of suitable width, a tread mold element wider than that using the original blank is produced, (see Fig. 7). By similarly employing the narrow segments, a narrower tread mold element is produced, (see Fig. 6).

By dividing the blank at different distances from the median plane, a complete range of tread mold widths, from the widest to the narrowest in use, may be obtained.

As the circumferential curvature of segments of any width is readily increased or decreased as hereinbefore described, it is evident that a complete range of tread mold elements may be produced differing in width and circumference. For each size of tread mold element it will of course be necessary to change the sizes and proportions of the metal walls 24, 24' and 26, 26'.

Any suitable tread pattern may be employed, preferably a bi-laterally symmetrical one, as shown in the drawing.

To give the mold side-walls a harder internal surface they may be given a metal coating by plating or by any other suitable process.

The method of assembly of the mold parts will be readily understood from the drawing.

The method of use also need not differ from that commonly known.

The advantages of my construction of mold are numerous, the principal being the low initial cost. It is merely necessary to provide one set of die-casting dies in order to produce tread mold segment blanks which may be used in the formation of molds of any width and any circumferential curvature, by cutting and deforming them as hereinbefore described.

The cost of milling the tread pattern on a large number of expensive metal molds of many different sizes is thus avoided. The various metal bands, or walls, required are of the simplest possible construction, and therefore cheaply produced. Also by molding the side-walls of cementitious material, as described, the cost of material and labor is greatly reduced from that of the conventional all-metal molds, and considerable weight is saved. Further, the use of the cementitious material for the side-walls not only reduces initial cost but makes it a very simple inexpensive matter to alter or repair a mold at any time.

In tire molds it is important that heat should be conducted quickly through the mold walls. I have found that the conductivity of the mold walls may be increased by using an aggregate, in the cementitious material, of metal in a discrete form, such as iron filings. Any metal may of course be employed which is inert in the cement, and the particles may be of any suitable size and in any proportion to give the desired conductivity and crushing strength.

What I claim as my invention:

1. The process of forming a tread element for a tire mold which comprises casting tread mold segments of ductile metal; deforming said segments by bending to change their circumferential curvature without the removal of metal and connecting a sufficient number of said segments to form a complete tread element of the same curvature.

2. The process of forming a tread element for a tire mold which comprises casting tread mold blanks of a ductile material, dividing said blanks circumferentially at one side of their median plane; deforming the resultant segments by bending to change their circumferential curvature; and fitting together a sufficient number of the narrow segments side by side and end to end to form one complete tread and of the others to form another tread.

3. The process of forming a tread element of a tire mold which comprises casting tread mold blanks of a ductile material and to the same circumferential curvature; dividing said blanks circumferentially at one side of their median plane; deforming the resultant segments by bending them to a different circumferential curvature; fitting together a sufficient number of the wide segments to form one complete tread and of the narrow segments to form another tread.

4. The process of forming a tread element for a tire mold which comprises casting tread mold blanks of a ductile material and having their tread forming surfaces substantially flat transversely, dividing said blanks circumferentially at one side of their median plane; deforming the resultant segments by bending to change their circumferential curvature; and fitting together a sufficient number of the narrow segments side by side and end to end to form one complete tread and of the others to form another tread.

5. The process of forming a tread element for a tire mold which comprises casting tread mold segments of ductile metal and symmetrically disposed at opposite sides of their median plane; deforming said segments by bending to change their circumferential curvature and connecting a sufficient number of said segments to form a complete tread element of the same curvature.

6. The process of forming a tread element for a tire mold which comprises casting tread mold blanks of a ductile material and symmetrically disposed at opposite sides of their median plane; dividing said blanks circumferentially at one side of their median plane; deforming the resultant segments by bending to change their circumferential curvature; and fitting together a sufficient number of the narrow segments side by side and end to end to form one complete tread and of the others to form another tread.

7. The process of forming a tread element for a tire mold which comprises casting tread mold blanks of a ductile material and having their tread forming surfaces substantially flat transversely and provided with a bi-laterally symmetrical tread pattern; dividing said blanks circumferentially at one side of their median plane; deforming the resultant segments by bending to change their circumferential curvature; and fitting together a sufficient number of the narrow segments side by side and end to end to form one complete tread and of the others to form another tread.

8. The process of forming a tread element for a tire mold which comprises forming a casting die for a mold segment having a circumferential curvature intermediate that of the largest and smallest tread element to be produced; casting mold segments of ductile metal in said die; deforming said segments by bending to change their circumferential curvature; and positioning a sufficient number of said segments, end to end, to form a complete tread element of the same curvature.

9. A method of forming a tread element for a tire mold which comprises casting tread mold blanks adapted to be fitted end to end to form a tread mold element; dividing a predetermined number of said blanks circumferentially at one side of their median plane to form two sets of segments of different width; dividing a similar number of said blanks circumferentially at a similar point at the other side of the median plane to form two sets of segments of different width; and fitting together a sufficient number of segments taken equally from each set of segments of the same width, side by side in pairs and end to end to form a complete tread.

10. A method of forming a tread element for a tire mold which comprises casting tread mold blanks adapted to be fitted end to end to form a tread mold element; dividing a predetermined number of said blanks circumferentially at one side of their median plane to form two sets of segments of different width; dividing a similar number of said blanks circumferentially at a similar point at the other side of the median plane to form two sets of segments of different width; fitting together a sufficient number of segments taken equally from each set of wide segments side by side in pairs and end to end to form a complete tread; and fitting together a sufficient number of segments taken equally from each set of narrow segments side by side in pairs and end to end to form another complete tread.

WILLIAM J. FRASER.